United States Patent [19]
Maeda

[11] Patent Number: 4,803,510
[45] Date of Patent: Feb. 7, 1989

[54] COPYING MACHINE HAVING REMOVABLE PROCESS UNIT IN A HOUSING

[75] Inventor: Masahiko Maeda, Izumiotsu, Japan

[73] Assignee: Mita Industrial Co., Ltd., Osaka, Japan

[21] Appl. No.: 19,721

[22] Filed: Feb. 27, 1987

[30] Foreign Application Priority Data

| | | | |
|---|---|---|---|
| Feb. 28, 1986 | [JP] | Japan | 61-29917[U] |
| Feb. 28, 1986 | [JP] | Japan | 61-29918[U] |
| Feb. 28, 1986 | [JP] | Japan | 61-29919[U] |
| Feb. 28, 1986 | [JP] | Japan | 61-45050 |
| Feb. 28, 1986 | [JP] | Japan | 61-45051 |
| Feb. 28, 1986 | [JP] | Japan | 61-45052 |
| Feb. 28, 1986 | [JP] | Japan | 61-45053 |
| Feb. 28, 1986 | [JP] | Japan | 61-45054 |

[51] Int. Cl.[4] .............................................. G01G 15/00
[52] U.S. Cl. ................................ 355/3 R; 355/3 DR; 355/3 DD; 355/3 SH
[58] Field of Search ................ 355/3 R, 3 SH, 3 DD, 355/3 DR, 14 SH

[56] References Cited

U.S. PATENT DOCUMENTS

| | | | |
|---|---|---|---|
| 4,462,677 | 9/1984 | Onoda | 355/3 R |
| 4,589,758 | 5/1986 | Kasama et al. | 219/216 X |
| 4,692,018 | 9/1987 | Tamura | 355/3 R |

FOREIGN PATENT DOCUMENTS

| | | | |
|---|---|---|---|
| 0101325 | 2/1984 | European Pat. Off. . | |
| 0180474 | 7/1986 | European Pat. Off. . | |
| 0240168 | 10/1987 | European Pat. Off. | 355/3 R |
| 60-79368 | 5/1985 | Japan . | |
| 60-101550 | 6/1985 | Japan . | |
| 60-140264 | 7/1985 | Japan | 355/3 R |
| 61-97663 | 5/1986 | Japan . | |
| 61-99157 | 6/1986 | Japan . | |
| 61-99158 | 6/1986 | Japan . | |
| 2074095 | 10/1981 | United Kingdom . | |

*Primary Examiner*—A. C. Prescott
*Assistant Examiner*—Jane Lau
*Attorney, Agent, or Firm*—Armstrong, Nikaido, Marmelstein & Kubovcik

[57] ABSTRACT

A copying machine comprising the body of said copying machine and a process unit attachable to and detachable from the body of said copying machine, wherein said process unit comprises a photosensitive drum, a charging device, a developing apparatus, and a cleaning apparatus within a housing of said process unit, and said process unit further comprises a route of conveyance for recording paper that tunnels through said housing in the region under said photosensitive drum.

18 Claims, 10 Drawing Sheets

COPYING MACHINE HAVING REMOVABLE PROCESS UNIT IN A HOUSING

BACKGROUND OF THE INVENTION

1. Field of the invention:

This invention relates to a compact and lightweight copying machine comprising the body of said copying machine and a process unit attachable to and detachable from the body of the said copying machine.

2. Description of the prior art:

In recent years, electrophotographic copying machines have been developed that are constructed such that the photosensitive drum, the developing apparatus, etc., which deteriorate because of use, or which are abraded during use, are integrated together and can be readily detached from and attached to the body of the copying machine, so that the replacement of abraded parts, etc., and/or the exchange of a process unit containing black toner therein for that containing color toner therein are easy. For example, U.S. Pat. No. 4,538,896 discloses a process unit in which a photosensitive drum, a charging device, a developing device, and a cleaning apparatus are united into one body. In the said process unit, the transcription apparatus is not incorporated; it is installed in the body of the copying machine so that the transcription apparatus installed in the body of the copying machine and the photosensitive drum housed in the unit face each other in order that the recording paper be conveyed through the space between the two. As a result, the route of conveyance of the recording paper must be at the boundary between the lower part of this unit and the body of the copying machine.

When the process unit is separated from the body of the copying machine, the photosensitive drum must be housed inside the housing of the process unit so that the surface of the photosensitive drum can be protected and/or so that the toner inside the process unit is not scattered outside, and it is necessary for the housing to be closed. For this reason, the process unit disclosed in the above-mentioned U.S. Pat. No. 4,538,896 is provided with a special drum cover to cover the photosensitive drum. With such a cover, when the process unit is installed into the body of the copying machine, a part of the housing is left open, the surface of the photosensitive drum is exposed to the outside of the housing, and the transcription apparatus provided in the body of the copying machine is placed in opposition to the said photosensitive drum. In the opposite situation, when the process unit is separated from the body of the copying machine, this cover covers the surface of the photosensitive drum, so that the housing is closed. With such a drum cover, a complex mechanism is required so that a part of the housing can be opened and closed in a narrow space. Moreover, since the structure is such that a part of the housing can be opened readily, there is the danger that the user of the copying machine may accidentally touch the surface of the photosensitive drum when such a cover is used. There is also the danger that toner will be scattered around the surroundings, since the housing is made with one part left open when the drum cover is to be used.

In addition to the above, the housing of the process unit is of a complex shape since the route of conveyance of the recording paper is to be through the space between the photosensitive drum provided inside the housing of the process unit and the transcription apparatus provided in the body of the copying machine, so working with it is inconvenient.

SUMMARY OF THE INVENTION

The copying machine of this invention, which overcomes the above-discussed and numerous other disadvantages and deficiencies of the prior art, comprises the body of said copying machine and a process unit attachable to and detachable from the body of said copying machine, wherein said process unit comprises a photosensitive drum, a charging device, a developing apparatus, and a cleaning apparatus within a housing of said process unit, and said process unit further comprises a route of conveyance for recording paper that tunnels through said housing in the region under said photosensitive drum.

In a preferred embodiment, the copying machine body is provided with a transcription device.

In a more preferred embodiment, a transcription chamber in which said transcription device is disposed is formed in the region under the photosensitive drum within said housing.

In a more preferred embodiment, the route of conveyance for recording paper is provided between said photosensitive drum and said transcription chamber.

In a more preferred embodiment, an opening for the introduction of the transcription device into the transcription chamber is provided in the housing.

In a more preferred embodiment, a pliable sealing material with which the opening for the introduction of the transcription device can be opened and closed is provided in the housing.

In a more preferred embodiment, the sealing material is pushed by said transcription device when said process unit is being installed in the copying machine body, thereby opening said opening for the introduction of the transcription device into the transcription chamber.

In a more preferred embodiment, the sealing material cuts off light.

In a more preferred embodiment, the intake opening and/or the ejection opening of the route of conveyance for recording paper is provided with a guide plate that can open and close said intake opening and/or the ejection opening.

In a more preferred embodiment, the guide plate opens the intake opening and/or the ejection opening when said process unit is installed in the copying machine body, and said guide plate closes the intake opening and/or the ejection opening when said process unit is detached from the copying machine body.

In a more preferred embodiment, when the intake opening and/or the ejection opening is opened, said guide plate is rotated toward the inside of the housing and stopped in such a manner that the leading edge of the guide plate is in a slanted position in the vicinity of the photosensitive drum.

In a more preferred embodiment, the guide plate is rotatably attached to the housing, said guide plate being provided with a spring means, by which said guide plate is pushed so as to close the intake opening and/or the ejection opening, and a rotating means, by which said guide plate is rotated, resisting the spring power of said spring means by a given angle when the process unit is installed in the copying machine body.

In a preferred embodiment, the intake opening of said route of conveyance for recording paper is at a position higher than that of the ejection opening thereof.

In a preferred embodiment, the transcription device is fixed into the housing of the process unit and said route of conveyance for recording paper is disposed between the photosensitive drum and the transcription device.

In a more preferred embodiment, the route of conveyance for recording paper is provided with a guide plate that can open and close the intake opening and/or the ejection opening of the route of conveyance for recording paper.

In a more preferred embodiment, the guide plate opens the intake opening and/or the ejection opening when said process unit is installed in the copying machine body, and closes the intake opening and/or the ejection opening when said process unit is detached from the copying machine body.

In a more preferred embodiment, when the intake opening and/or the ejection opening is opened, said guide plate is rotated toward the inside of the housing and stopped in such a manner that the leading edge of the guide plate is in a slanted position in the vicinity of the photosensitive drum.

In a more preferred embodiment, the guide plate is rotatably attached to the housing, said guide plate being provided with a spring means, by which said guide plate is pushed so as to close the intake opening and/or the ejection opening, and a rotating means, by which said guide plate is rotated, resisting the spring power of said spring means by a given angle when the process unit is installed in the copying machine body.

In a preferred embodiment, the shape of the housing of said process unit is a right-angled parallelepiped.

Thus, the invention disclosed herein makes possible the objects of (1) providing a copying machine with a simple structure, in which there is no danger of the user accidentally touching the surface of the photosensitive drum, so that there is no danger of damage to the surface of the photosensitive drum, and so that there is no danger of a lowering of the quality of the copied images that are obtained; (2) providing a copying machine in which the exchange of the process unit containing black toner for that containing color toner can be carried out; (3) providing a copying machine in which the photosensitive drum is not exposed to light even when the process unit has been removed from the body of the copying machine; (4) providing a copying machine in which the scattering of the toner into inside the body of the machine is prevented when the process unit is attached to the body of the copying machine; (5) providing a copying machine in which the recording paper is guided to the photosensitive drum supplied accurately to inside the housing of the process unit, so that accurate transcription of the toner image on top of the photosensitive drum can take place on the recording paper and, moreover, paper jamming and such problems do not occur; (6) providing a copying machine in which the recording paper on which a toner image has been transcribed is ejected accurately to the outside of the process unit; (7) providing a copying machine that has a process unit the housing of which is in a simple shape such as that of a rectangular parallelepiped or a cube, so that its handling is easy, and shipping from the factory is also easy; and (8) providing a copying machine that has a process unit the housing of which is in a simple shape such as that of a rectangular parallelepiped or a cube, so that its storage in the warehouse is easy, and the storage space needed is as small as possible.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

EXAMPLE 1

Figure 1:
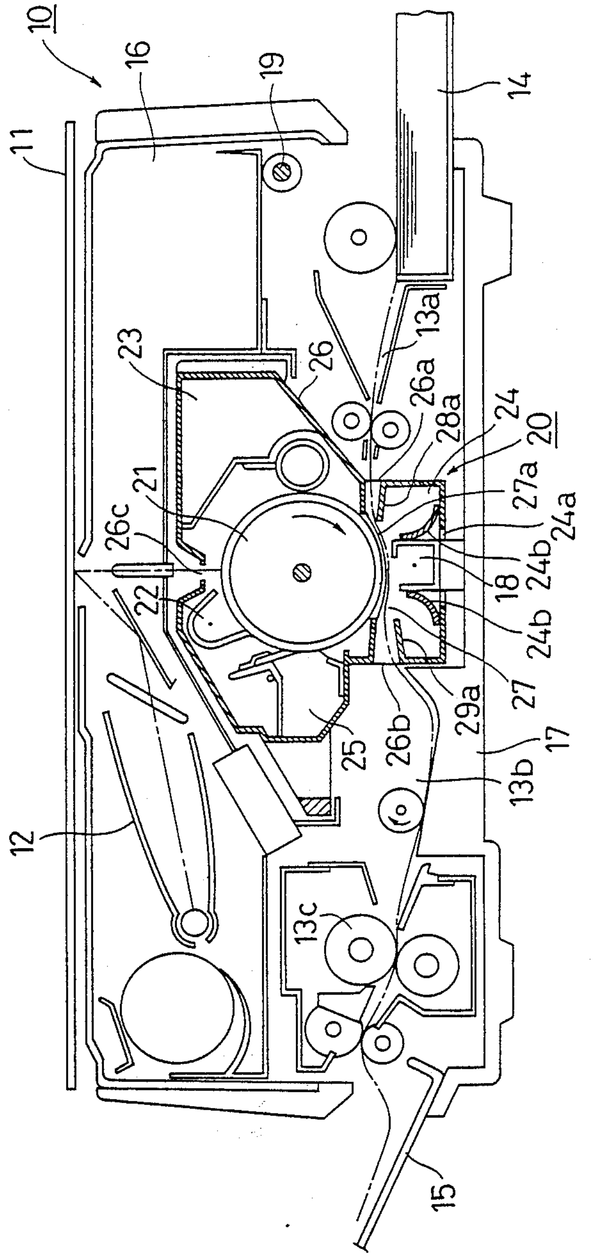
FIG. 1 is a vertical sectional view showing a copying machine of this invention.
Figure 2:
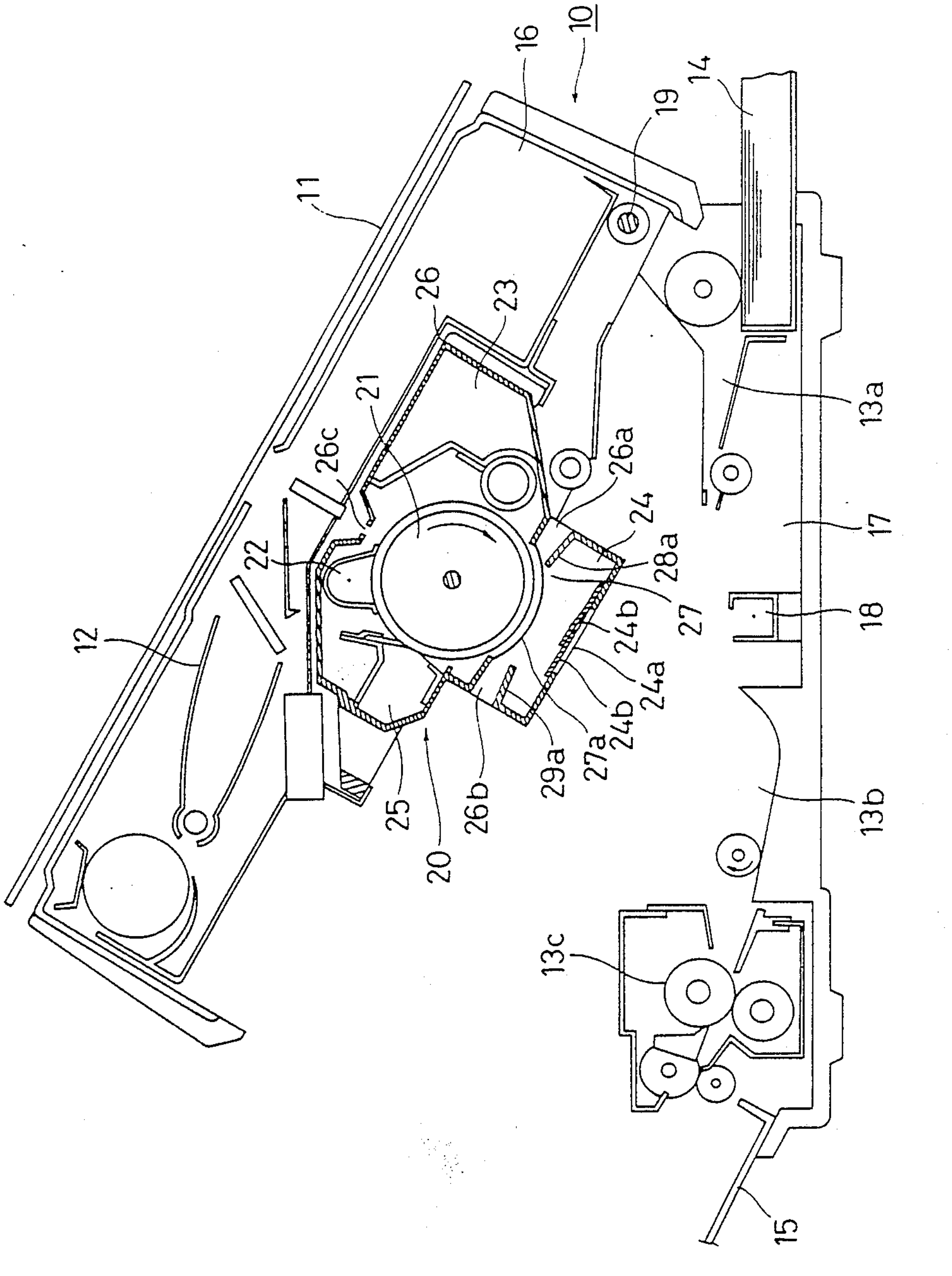
FIG. 2 is a vertical sectional view showing the body of the copying machine shown in FIG. 1 with the upper half rotated upward.

FIGS. 1 and 2 show a copying machine of this invention, which comprises an electrophotographic copying-machine body 10 and a process unit 20. In the copying machine body 10, the upper half 16 and the lower half 17 are held by pivot 19 so that they can rotate, with the upstream section 13*a* and the downstream section 13*b* of the route of conveyance of the recording paper as the boundary. The process unit 20 is installed by being slid from the front of the upper half 16 (the surface of the paper of the figure) to the back (in the direction of the reverse side of the paper of the figure).

The process unit 20 comprises a photosensitive drum 21, which is rotatable in the center section of the housing 26 of the process unit 20, a charging device 22, a developing device 23, and a cleaning apparatus 25, which are all fixed in an integrated way into the housing 26. The charging device 22 is positioned above the photosensitive drum 21. The developing device 23 is installed in the downstream direction of paper flow from the rotating photosensitive drum 21 with regard to the charging device 22. The cleaning apparatus 25 is installed in the upstream direction of paper flow from the rotating photosensitive drum 21 with regard to the charging device 22. In the upper surface of housing 26, a slit 26*c* is provided. The slit 26*c* is between the charging device 22 and the developing device 23.

In the lower part of housing 26, there is a transcription chamber 24. The transcription chamber 24 is placed in the region underneath the photosensitive drum 21. In the vicinity of the transcription chamber 24 near the photosensitive drum 21, the route of conveyance 27 for recording paper tunnels through the housing 26. On the upstream side of flow of recording paper in the route of conveyance 27, there is a connecting intake opening 26a for recording paper formed in the housing 26, and in the direction of downstream flow of recording paper in the route of conveyance 27, there is a connecting ejection opening 26b formed for recording paper in the housing 26. A separating means, such as a separating belt 27a, for separating recording paper from the photosensitive drum 21 is disposed in the route of conveyance 27 along the photosensitive drum 21. As the separating means, a separating nail, an AC charger, etc., can be used. Recording paper flows through the route of conveyance 27 for recording paper and is conveyed into the inside of the housing 26 in the region beneath the developing device 23, where it is transcribed with a toner image, after which it is conveyed from the housing 26 to the region beneath the cleaning apparatus 25. So that after recording paper is conveyed from the outside of the housing 26 through the intake opening 26a into the inside of the housing 26 where it is transcribed with a toner image, it will be conveyed smoothly out of housing 26 through ejection opening 26b, it is preferable that the intake opening 26a is an appropriate height above the ejection opening 26b (i.e., that it is in the vicinity of the photosensitive drum 21).

On the upstream side of the route of conveyance 27 for recording paper, there is an introduction guide plate 28a. On the downstream side of the route of conveyance 27 for recording paper, there is an ejection guide plate 29a. The introduction guide plate 28a extends from the lower edge of the intake opening 26a of the housing 26 in the downstream direction, and its downstream edge is sloped upward so that it is near the photosensitive drum 21. The ejection guide plate 29a extends from the lower edge of the ejection opening 26b in the upstream direction. In the same way as before, the upstream edge of ejection guide plate 29a is sloped upward so that it is near the photosensitive drum 21.

The useful lifespan of the photosensitive drum 21 and the charging device 22 of the process unit 20 is established to be about the same as the period required to consume the toner supplied in the developing device 23. The capacity of the used-toner tank (a tank for the storage of toner used in developing) in the cleaning apparatus 25 is established in the same way to be within the above-mentioned period of time.

There is an introduction entrance 24a to the transcription chamber in the bottom of the transcription chamber 24, which is in the bottom part of housing 26. The said entrance 24a is connected with the inside of the transcription chamber 24 and the outside of the housing 26. The said entrance 24a is of such a size that the transcription device 18 to be mentioned later can be introduced thereinto. The entrance 24a is, for example, obtained by the opening and closing of two sealing materials 24b. The base edges of the sealing materials 24b are fixed in the vicinity of the edge of the entrance 24a. The leading edges of the two sealing materials 24b are placed so as to overlap in the central portion of the entrance 24a (FIG. 2). As the sealing materials 24b, a light-shielding and pliable material such as plastic film can be used.

The process unit 20 is installed into the upper half 16 of the copying machine body 10 that rotates around pivot 19 as mentioned before. In the upper part of the said upper half 16, there is a sliding manuscript tray 11, which can move at right angles to the central axis of photosensitive drum 21 in the process unit installed in the upper half 16 of the copying machine. Below the manuscript tray 11 is an optical system 12. The optical system 12 exposes the image of the manuscript placed on the manuscript tray 11 to the surface of the photosensitive drum 21 via the slit 26c in the housing 26 as the manuscript tray 11 moves.

Placed opposite to the photosensitive drum 21 in the lower half 17 of the copying machine body 10, there is a transcription device 18. When the upper half 16 and the lower half 17 of the copying machine body 10 are being connected, this transcription device 18 is introduced into the transcription chamber 24 of the process unit 20 as the sealing materials 24b are pushed open to make the entrance 24a. When the upper half 16 and the lower half 17 are being connected, the sealing materials 24b come to touch the side faces of transcription apparatus 18 (FIG. 1). As a result, the space between the transcription device 18 and the entrance 24a is closed by the sealing materials 24b, and there is no danger that dust, etc., will enter the transcription chamber 24 from the outside through the entrance 24a, nor is there danger that toner will scatter from the inside of the housing 26 to the outside parts.

The upper half 16 and the lower half 17 of the copying machine body 10 are separated by the upstream section 13a and downstream section 13b of the route of conveyance of the recording paper. These routes 13a and 13b for conveyance of recording paper run through the intake opening 26a and the ejection opening 26b that are formed by the housing 26 of the process unit 20 installed in the upper half 16 when the upper half 16 and lower half 17 of the copying machine body 10 are connected with each other. As a result, the upstream section 13a of the route for the conveyance of recording paper, the route 27 for the conveyance of recording paper inside the housing 26, and the downstream section 13b of the route for the conveyance of recording paper are connected. For that reason, the recording paper in the paper holder 14 of the copying machine body 10 passes through conveyance route 13a to the conveyance route 27 for recording paper of the transcription chamber 24 and then passes through the downstream section 13b of the route of conveyance to be ejected onto tray 15 of the copying machine body 10. During this time, the toner image on the photosensitive drum 21 is transcribed onto the recording paper by the action of the transcription device 18 inside the transcription chamber 24 within the housing 26. The toner image that has been transcribed on the recording paper is fixed on the paper by the fixing device 13c provided in the conveyance route 13b.

The installation of the process unit 20 into the copying machine body 10 is as follows. First, the upper half 16 of the copying machine body 10 is rotated upward to separate it from the lower half 17. Then, the process unit 20 is slid in from the front into the upper half 16 to install it there. Next, this upper half 16 is rotated downward so as to be connected with the lower half 17. At this time, the sealing materials 24b closing the transcription chamber 24 of the process unit 20 are pushed open by the transcription device 18 attached to the lower half 17 of the copying machine body 10. As a result, the introduction entrance 24a of the transcription device is opened. The said transcription device 18 is introduced into the inside of the transcription chamber 24 while it touches the sealing materials 24b. Then, the upper half 16 and lower half 17 are connected, and the transcription device 18 faces a given portion of the photosensitive drum 21 in such a manner that the route of conveyance for recording paper 27 of the inside of the housing 26 is sandwiched between the transcription device 18 and the position for the photosensitive drum 21.

The copying processes of this copying machine, which are the same as those of conventional electrophotographic copying machines, are as follows: The charging device 22 of the process unit 20 uniformly charges the surface of the photosensitive drum 21. Next, the manuscript placed on the manuscript tray 11 is exposed to light by an optical system 12, and an electrostatic latent image is formed on the surface of the photosensitive drum 21. The latent image is developed by the developing device 23. The recording paper passes through the upstream section 13*a* of the route for conveyance of paper, and is introduced into the route 27 for conveyance of recording paper inside the housing 26 of the process unit 20. At that time, the paper is guided by the guide plate 28*a* so that it touches the photosensitive drum 21. The toner image on the photosensitive drum 21 is transcribed by the transcription device 24 onto the recording paper that is touching the photosensitive drum 21. The recording paper on which the toner image has been transcribed is separated from the photosensitive drum 21 by the separating belt 27*a* and is guided by the ejection guide 29*a* through the ejection opening 26*b* to the outside of the housing 26. Then, the said recording paper passes through the downstream section 13*b* of the route for conveyance of paper to reach the fixing apparatus 13*c*, where the toner image is fixed on the recording paper. The recording paper on which the toner image has been fixed is ejected onto the tray 15. After the toner image has been transcribed onto the recording paper, any toner remaining on the photosensitive drum 21 is removed by the cleaning apparatus 25.

The lifespan of the photosensitive drum 21 and the charging device 22 of the process unit 20 are established to be roughly equal to each other, and the volume of toner inside the developing device 23 and the volume of used toner inside the cleaning apparatus 25 also correspond with these lifespans. For that reason, when the limit of usefulness of the photosensitive drum 21 and the other parts is reached, it is possible to exchange a new process unit for the old one. To do so, first, the upper half 16 of the copying machine body 10 is rotated upward. At that time, the transcription device 18 is detached from the process unit 20, and the leading edges of the sealing materials 24*b* return to their original overlapping position because the sealing materials 24*b* are pliable, so the entrance 24*a* to the housing 26 is shut. Then, the entire process unit 20 is slid in the direction of the axis of the photosensitive drum 21, so that it is separated from the said upper half 16. Next, a new process unit 20 is installed in the upper half 16.

The exchange of a new process unit in which color toner is contained in the developing apparatus for a process unit containing black toner is also carried out in the same manner as mentioned above.

EXAMPLE 2

Figure 3:
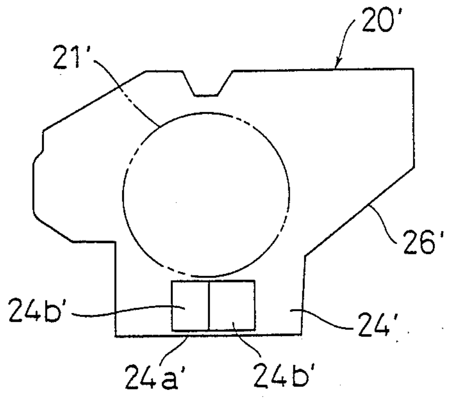
FIG. 3 is a rear sectional view of the process unit of another copying machine of this invention.
Figure 4:
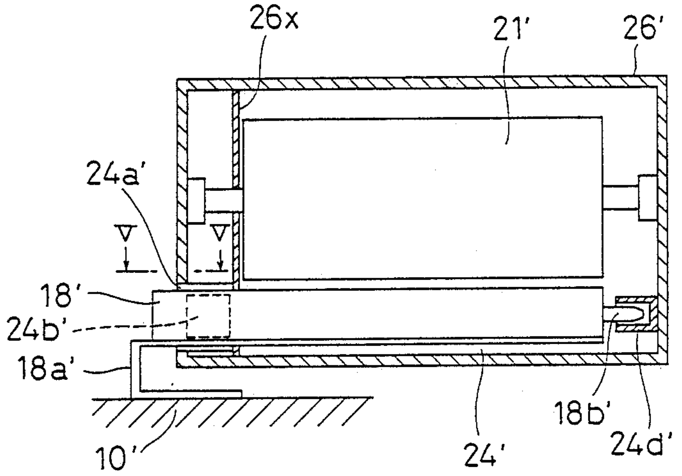
FIG. 4 is a vertical sectional view of the process unit shown in FIG. 3.
Figure 5:
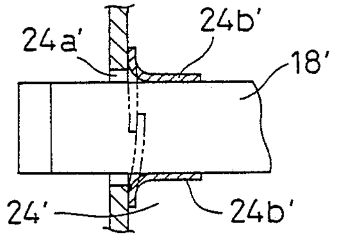
FIG. 5 is a sectional view of part of the apparatus shown in FIG. 4 cut along the V—V line.

This invention is also applicable to a copying machine body 10 that is made in one part so that the upper half 16 and the lower half 17 cannot be separated. In the copying machine body that cannot be separated into an upper half and a lower half, the process unit can be attached and detached by being slid at right angles to the route of conveyance of the recording paper. FIGS. 3 to 5 show this kind of copying machine body with a process unit 20′ that can be attached thereto or detached therefrom. In the process unit 20′, there is an entrance 24*a*′ for use in the introduction of the transcription device into a transcription chamber 24′ that is formed in the region underneath the photosensitive drum 21′ inside the housing 26′. As in the above example, sealing materials 24*b*′ are at both edges of the said entrance 24*a*′ that correspond to the direction of the flow of recording paper in the route for the conveyance of paper. The leading edges of both sealing materials 24*b*′ overlap in the central portion of the entrance 24*a*′ so as to shut this entrance 24*a*′. In the opposite section on the side surface of the transcription chamber 24′ to the entrance 24*a*′, there is an indentation 24*d*′ that matches the protrusion 18*b*′ to be described below that is disposed on one end of the transcription device 18′.

Transcription device 18′ is fixed to the copying machine body 10′ by a supporting material 18*a*′. The supporting material 18*a*′ supports the transcription device 18′ on one side above the copying machine body 10′ from underneath one end of the longitudinal direction of the transcription device 18′ so that there is a small space between the bottom surface of the transcription device 18′ and the copying machine body 10′. On the other end of the longitudinal direction of the transcription device 18′, there is protrusion 18*b*′. The said protrusion 18*b*′ matches the indentation 24*d*′ disposed in the transcription chamber 24′ so that the other end of the transcription device 18′ can be supported by the housing 26′ of the process unit 20′. By the engagement of both parts, the process unit 20′ is held in a fixed position with respect to the copying machine body 10′ so that the transcription device 18′ held in the copying machine body 10′ and the photosensitive drum 21′ inside the process unit 20′ are opposite to each other. Explanations of the other structures are omitted because they are the same as in the previous example.

The installation of such a process unit 20′ to the body of a copying machine is as follows: The process unit 20′ in its entirety is transferred into the inside of the copying machine body 10′ by the introduction of the protruding part 18*b*′ of the transcribing device 18′ that is supported in the copying machine body 10′ into the entrance 24*a*′ of the housing 26′. In this way, protrusion 18*b*′ pushes open the sealing materials 24*b*′ so that entrance 24*a*′ is opened, and the transcription device 18′ is introduced inside the transcription chamber 24′ of the process unit 20′. At this time, the sealing materials 24*b*′ come to touch the outside surface of the transcription device 18′ because of their pliability. Then, protrusion 18*a*′ of the transcription device 18′ is engaged with the matching indentation 24*b*′ that is provided on the inside surface of transcription chamber 24′ so that the process unit 20′ is installed in a fixed position with respect to the copying machine body 10′ (and therefore the transcription device 18′).

Guide materials can be provided for the transcription device 18′ so that it is easy to engage the protrusion 18*b*′ with the matching indentation 14*d*′ when the transcription device 18′ is introduced into the transcription chamber 24′ of such a process unit 20′.

EXAMPLE 3

Figure 6:
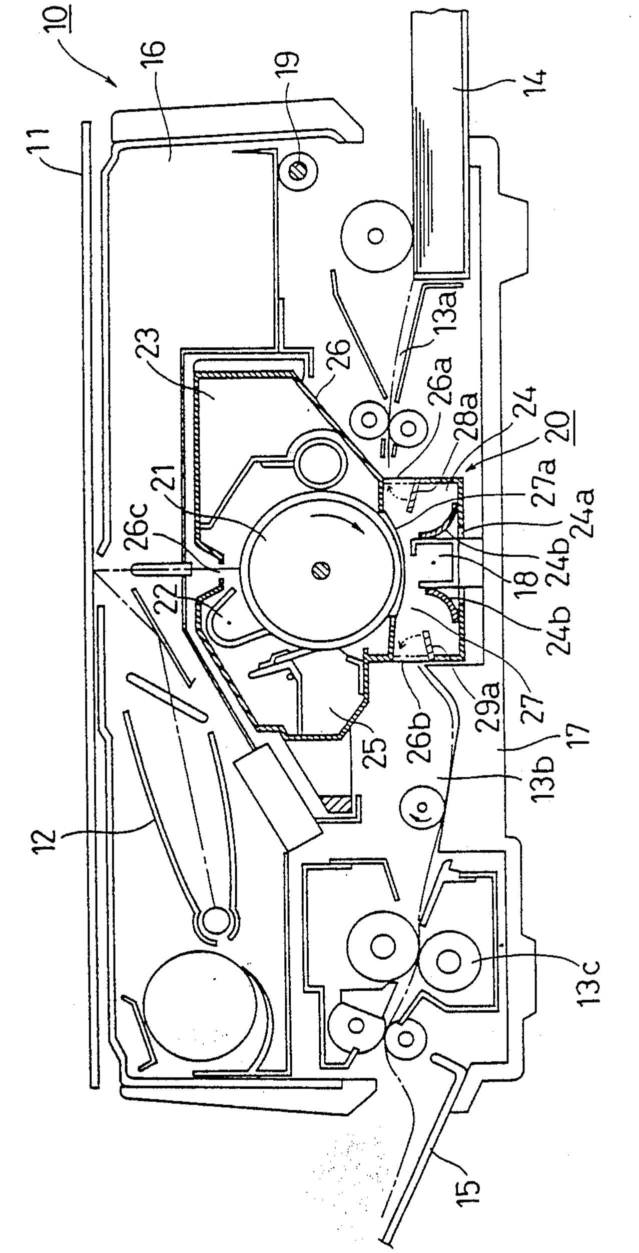
FIG. 6 is a vertical sectional view of another copying machine of this invention.
Figure 7:
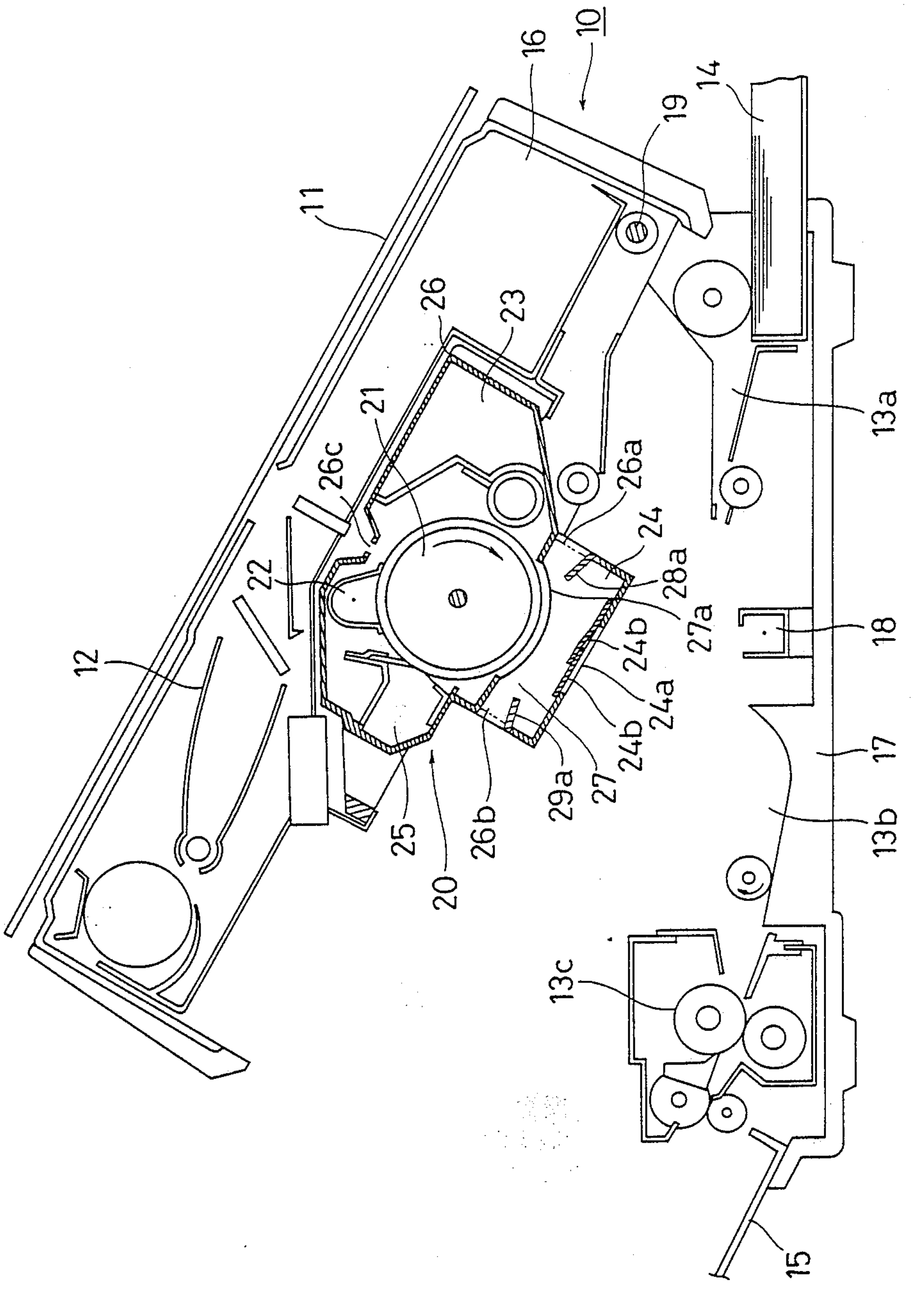
FIG. 7 is a vertical sectional view showing the body of the copying machine shown in FIG. 6 with the upper half rotated upward.

Another copying machine of this invention is shown in FIGS. 6 and 7 that is provided with the following structure in addition to the structure of Example 1 (FIGS. 1 and 2): When the process unit 20 is installed in the copying machine body 10', the intake opening 26a and the ejection opening 26b of the recording paper are opened by the guide plate 28a for introduction of recording paper and the guide plate 29a for ejection of recording paper that are provided in the route 27 for the conveyance of recording paper in the housing 26 of the process unit 20. When the process unit 20 is removed from the copying machine body 10', both the intake opening 26a and the ejection opening 26b are shut.

Figure 8:
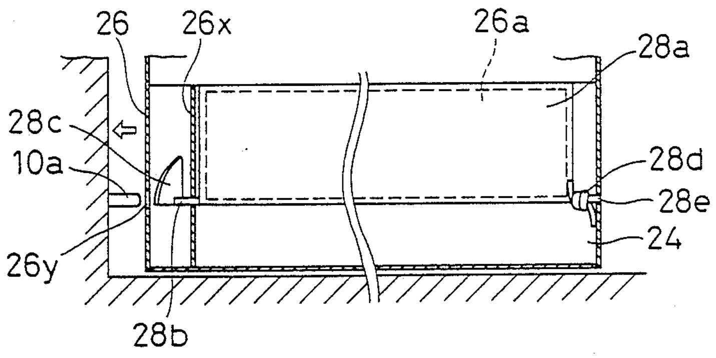
FIGS. 8 and 9 are side views of the main parts of the process unit shown in FIG. 6, illustrating the procedure for the installation of the process unit into the body of the copying machine.
Figure 9:
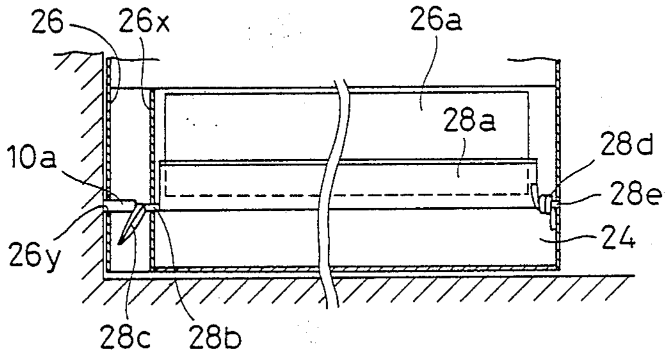

One example of a structure in which the introduction guide plate 28a and the intake opening 26a can be opened and shut is shown in FIGS. 8 and 9. FIGS. 8 and 9 show the introduction guide plate 28a seen from the inside of the transcription chamber 24. An inner wall 26x is disposed inside of the process unit 20. This inner wall 26x is at a fixed distance from the housing 26.

The introduction guide plate 28a is the size of the intake opening 26a so that it can shut the opening. The support shafts 28e and 28b protrude at each end of the said introduction guide plate 28a in the longitudinal direction. One support shaft 28e is rotatably supported by the housing 26 constituting the side surface of the transcription chamber 24, and the other support shaft 28b is rotatably supported on the inner wall 26x. The said support shaft 28b tunnels through the inner wall 26x, and its end is at a position between the housing 26 and the inner wall 26x. In the space between the housing 26 and the inner wall 26x, as a rule, a driving means for driving the photosensitive drum and the developing apparatus is disposed. There is a coiled spring 28d set outward on the support shaft 28e supported on the housing 26. One end of the said coil spring is fixed on the guide plate 28a and the other end is fixed on the part of the housing 26 that is the side surface of the transcription chamber 24, so that introduction guide plate 28a can be pushed so as to shut the intake opening 26a.

The end of the other support shaft 28b is attached to a contact material 28c made by the screwing of a thin plate by only one-quarter of a turn of a spiral. The said contact material 28c is fixed so that the center of the spiral is the end of the support shaft 28b.

Parallel to the support shaft 28b mentioned above, there is a pushing rod 10a provided on the copying machine body 10. When the process unit 20 is installed in the copying machine body 10, the said pushing rod 10a passes through a tunneling hole 26y provided in the housing 26, and touches the contact material 28c, which is between the housing 26 and the inner wall 26x. The end of the said pushing rod 10a touches a position slightly off-center from the center of the spiral of the contact material 28c. In these circumstances, when the process unit 20 is slid again into the copying machine body 10, the pushing rod 10a pushes against the material 28c. By this, the end of the pushing rod 10a will lend power to the direction of rotation of the surroundings of material 28c, so the said material 28c can rotate resisting the spring power of the coiled spring 28d. When the process unit 20 is completely installed in the copying machine body 10, the material 28c is rotated toward the inside of the transcription chamber 24 by not 90° but by only about 60°-80°, and the end is stopped in a slightly upward slanting position. By this, the guide plate 28a opens the intake opening 26a, and the edge of the said guide plate 28a will rotate toward the inside of route 27 for the conveyance of recording paper so as to be stopped in a slanting position in the vicinity of the photosensitive drum 21. When the process unit 20 is removed from the copying machine body 10, the pushing rod 10a stops pushing the contact material 28c, so that the introduction guide plate 28a can be rotated by the spring power of the coiled spring 28d so as to close the intake opening 26a.

The ejection guide plate 29a provided in the downstream side of the route 27 for the conveyance of recording paper is constructed in the same way, so that when the process unit 20 is removed from the copying machine body 10, the said ejection guide plate 29a shuts the ejection opening 26b, and also so that when the process unit 20 is installed in the copying machine body 10, the ejection guide plate 29a opens the ejection opening 26b. The ejection guide plate 29a opening the ejection opening 26b has an edge that is rotated into the route 27 for the conveyance of recording paper and that is stopped in a slanted position so as to be in the vicinity of the photosensitive drum 21.

In a copying machine constructed in this way, the upper half 16 of the copying machine body 10 is rotated upward to separate it from the lower half 17, and in this position the process unit 20 is slid into the upper half 16 of the copying machine from the front to install it, whereby the introduction guide plate 28a and the ejection guide plate 29a rotate toward the inside of the housing 26, and the intake opening 26a and the ejection opening 26b are both opened in the route 27 for the conveyance of recording paper; moreover, the introduction guide plate 28a and the ejection guide plate 29a are stopped in such a manner that their leading edges are in a slanted position in the vicinity of the photosensitive drum 21. In this position, the copying machine copies in the same way as the machine of Example 1, resulting in a transcribed image on the recording paper.

When the limits of usefulness of the photosensitive drum 21, etc., are reached and the process unit 20 is replaced by a new process unit, the upper half 16 of the copying machine body 10 is rotated in the upper direction and the process unit in its entirety is slid in a direction parallel to the axis of the photosensitive drum 21. The process unit 20 is then removed from the said upper half 16, so that the introduction guide plate 28a and the ejection guide plate 29a rotate and close both the intake opening 26a and the ejection opening 26b. The process unit 20 being separated from the upper half 16 of the body of the copying machine results in the closing of the intake opening 26a and ejection opening 26b for recording paper by the introduction guide plate 28a and the ejection guide plate 29a, and the entrance 24a for the introduction of transcription paper is closed by the sealing materials 24b, so that the housing 26 has its opening completely shut.

EXAMPLE 4

This example is of the same copying machine as in Example 3 with a different kind of introduction guide 28a, in which the contact material 28c is provided with a groove in which the tip of the pushing rod 10a can be engaged so that the material 28c is rotated accurately by the rotation of the pushing rod 10a. It is also possible for the tip of the pushing rod 10a to be made in the shape of a hemisphere so that it will touch the contact material 28c accurately. Or, it is possible to provide a round top for the pushing rod 10a that can rotate freely.

EXAMPLE 5

Figure 10:
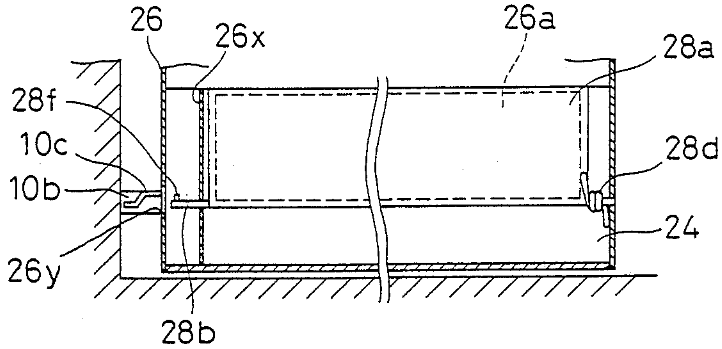
FIGS. 10 and 11 are side views of the main parts of a process unit different from the one shown in FIG. 6, used to illustrate the explanation below of the procedure for the installation of the process unit into the body of the copying machine.
Figure 11:
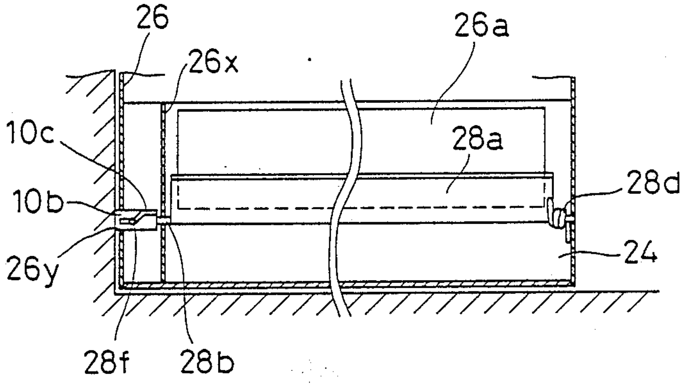

This example is of the same copying machine as in Example 3 with a yet different introduction guide 28*a* as shown in FIGS. 10 and 11, wherein there is a protrusion 28*f* on the tip of the support shaft 28*b*, and a tube-shaped guide 10*b* in the copying machine body 10, into which a support shaft 28*b* fits. This tube-shaped guide 10*b* has a spiral-shaped groove 10*c* into which the above-mentioned protrusion 28*f* fits.

EXAMPLE 6

Figure 12:
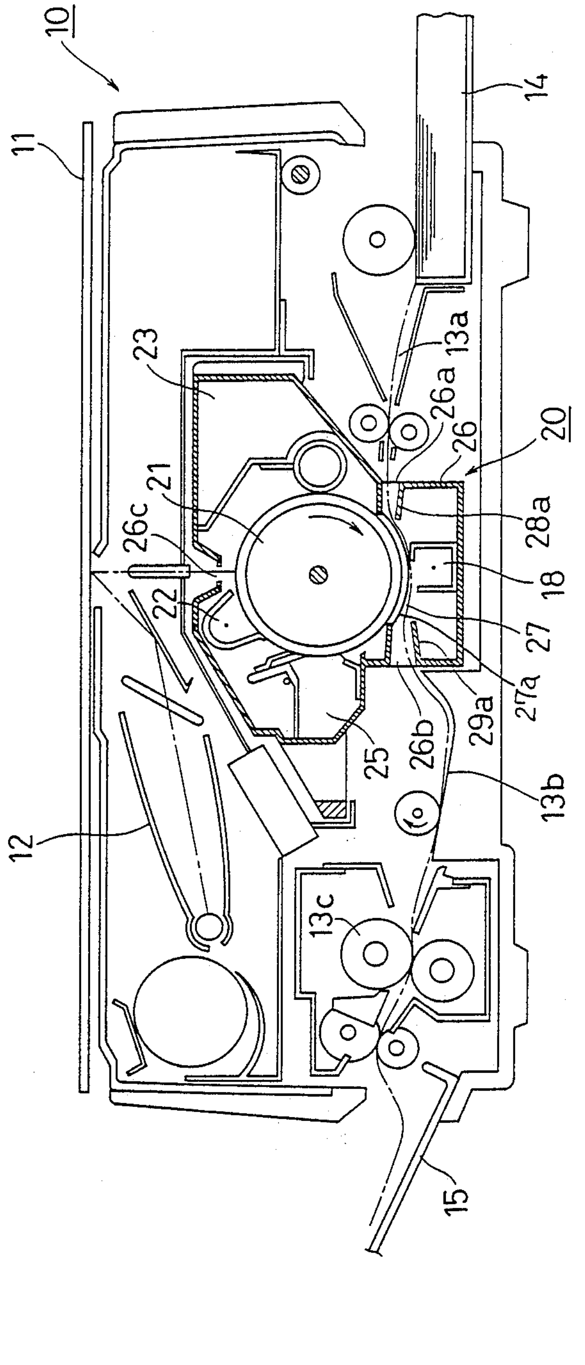
FIGS. 12, 13, and 14 are vertical sectional views showing another copying machine of this invention.
Figure 13:
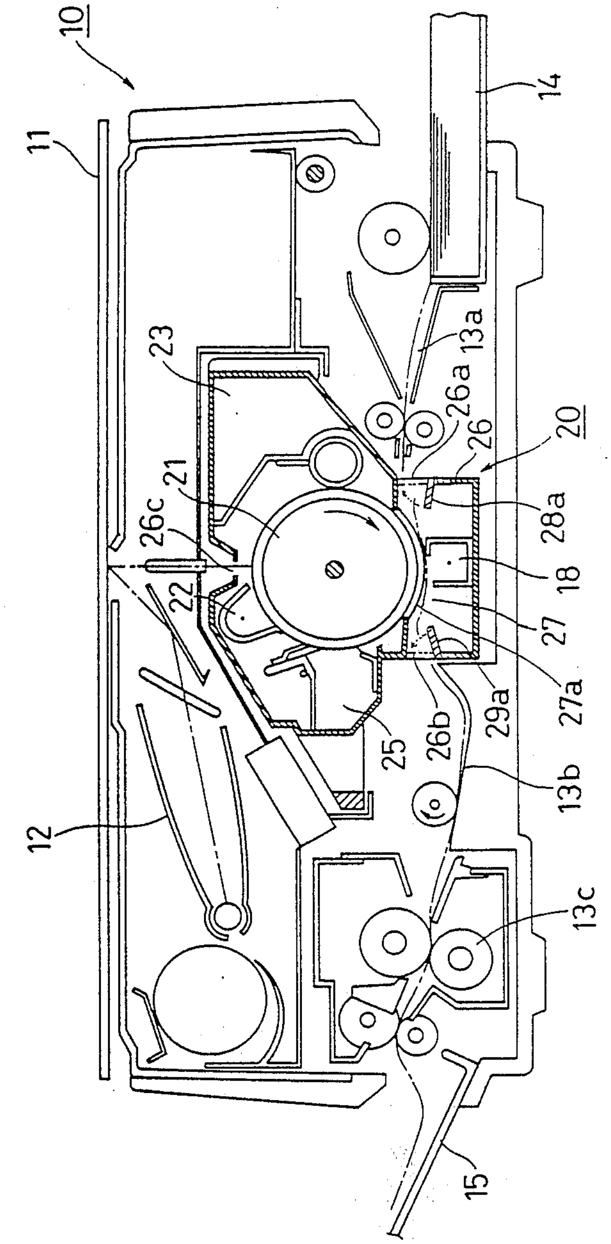

FIG. 12 shows another copying machine of this invention in which the transcription device is fixed into the process unit. Process unit 20 is provided as an integrated part of the housing 26 with the apparatus needed for the copying process. The apparatus needed for the copying process includes a photosensitive drum 21, a charging device 22, a developing device 23, a transcription device 18, and a cleaning apparatus 25. The charging device 22 is placed above the photosensitive drum 21 that can be rotated in the center of the housing 26. The developing device 23, transcription device 18, and cleaning devices 25 are placed in that order in the downstream direction of the rotation of the photosensitive drum 21 with regard to the charging device 22. The transcription device 18 is placed beneath the photosensitive drum 21. The upper portion of the housing 26 has a slit 26*c* therein, which is positioned between the charging device 22 and the developing device 23.

The lifespan of the photosensitive drum 21 in the process unit 20 is about the same as the time needed to use all of the toner contained by the developing device 23. The lifespans of the charging device 22 and the transcription device 18 are also about the same as the lifespan of the photosensitive drum 21. In addition, the capacity of the cleaning apparatus 25 for used toner is set so that the used toner can be collected for the same period of time mentioned above.

In the space between the photosensitive drum 21 and the transcription device 24 provided in the housing 26, there is a route 27 for the conveyance of recording paper. The said route 27 for the conveyance of recording paper tunnels through the housing 26; the recording paper passes through from the region underneath the developing device 23 toward the region underneath the cleaning apparatus 25. On the upstream side of the route 27 for the conveyance of recording paper, an intake opening 26*a* is formed connected to the housing 26. On the downstream side of the route 27 for the conveyance of recording paper, an ejection opening 26*b* is formed connected to the housing 26. Recording paper comes from the outside of the housing 26 into the inside of the housing 26 through the intake opening 26*a*, where it is transcribed with a toner image, and passes smoothly to the outside of the housing 26 through the ejection opening 26*b*; for this purpose, it is preferable to establish the intake opening 26*a* at a position appropriately higher than that of the ejection opening 26*b* (preferably at a position near the photosensitive drum 21).

On the upstream side of the route 27 for the conveyance of recording paper, there is an introduction guide plate 28*a*. Also, on the downstream side of route 27 for the conveyance of recording paper, there is an ejection guide plate 29*a*. The introduction guide plate 28*a* is an extension from the lower edge of intake opening 26*a* of the housing 26 to the downstream side thereof. The said introduction guide plate 28*a* is slanted in the vicinity of the photosensitive drum 21 in its downstream edge. The ejection guide plate 29*a* is an extension from the lower edge of the ejection opening 26*b* to the upstream side thereof. In the same way, the upstream edge of the ejection guide plate 29*a* slants in the vicinity of the photosensitive drum 21. In the space between the introduction guide plate 28*a* and the ejection guide plate 29*a*, the transcription device 24 and the photosensitive drum 21 are set face to face. A separating belt 27*a* is disposed in the route 27 for the conveyance of recording paper beneath the photosensitive drum 21.

The copying machine body 10 can have a process unit 20 with the above-mentioned structure. In the upper part of the copying machine body 10, there is a sliding manuscript tray 11, which can moves at right angles to the axis of the photosensitive drum 21 to be installed in the copying machine. There is an optical system 12 provided underneath the manuscript tray 11. This optical system 12 exposes the manuscript placed on the manuscript tray 11 to the surface of the photosensitive drum 21 via the slit 26*c* in the housing 26 as the manuscript tray 11 moves.

In the lower part of the copying machine body 10, there are provided an upstream section 13*a* and a downstream section 13*b* of the route for the conveyance of recording paper. The upstream section 13*a* is connected with the intake opening 26*a* of the housing 26. The downstream section 13*b* is connected with the ejection opening 26*b* of the housing 26. As a result, the recording paper in the paper holder 14 provided in the copying machine body 10 can be conveyed from the upstream section 13*a* of the route for the conveyance of recording paper into the route 27 for the conveyance of recording paper of the process unit 20 installed in the copying machine body 10, and from there ejected from the downstream section 13*b* of the route for paper conveyance onto the top of tray 15. Recording paper is transcribed with a toner image while it is in the route 27 for the conveyance of recording paper inside housing 26. The recording paper on which the toner image has been transcribed is separated from the photosensitive drum 21 by the separating belt 27*a*. There is a fixing apparatus 13*c* provided in the downstream section 13*b* of the route for the conveyance of recording paper, by which the toner image on the recording paper is fixed onto the recording paper while it is conveyed.

The copying processes of a copying machine with the above-mentioned structure are the same as those of the machines of Examples 1 and 2, so their explanation is omitted here.

The lifespans of the photosensitive drum 21, the charging device 22, and the transcription apparatus 18 provided in the process unit 20 are set to be nearly equal to each other. The amount of toner in the developing device 23 and the capacity of the cleaning apparatus 25 for used toner are set to be within the above-mentioned lifespans. Accordingly, when the limit of usefulness of the photosensitive drum 21 is reached, the whole of the process unit 20 is pulled out from the copying machine body 10 in the axis direction of the photosensitive drum 21 to be exchanged for a new process unit.

EXAMPLE 7

Even when the transcription device 18 is fixed inside the process unit 20 as described in Example 6, it is possible for an introduction guide plate 28*a* and an ejection guide plate 29*a* provided in the route 27 for the conveyance of recording paper to be constructed such that when the process unit 20 is installed in the copying machine body 10, the intake opening 26a and the ejection opening 26b that are provided in the housing 26 are opened, and when the process unit 20 is removed from the copying machine body 10, they are closed. Details of the structure are the same as shown in Example 3 (FIGS. 8 and 9), Example 4, and Example 5 (FIGS. 10 and 11), so their explanation is omitted here.

EXAMPLE 8

Figure 14:
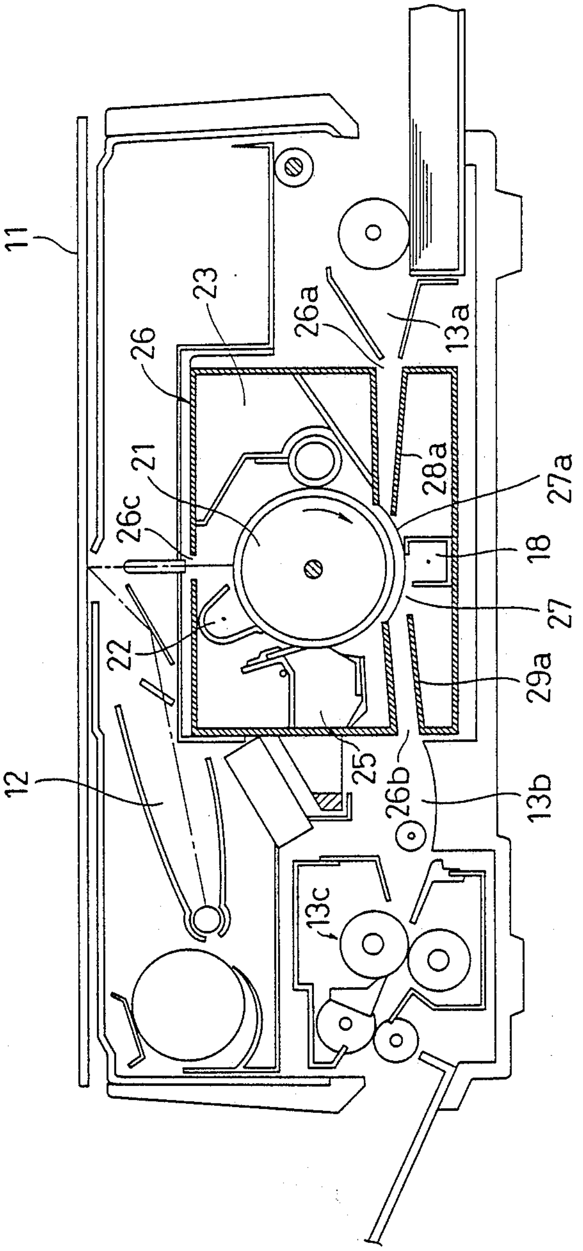

In the copying machine of Example 6, it is not necessary to make the housing 26 of a complicated shape since the route 27 for the conveyance of paper tunnels through the housing 26 of the process unit 20; as shown in FIG. 14, a right-angled parallelepiped can also be used. It is not shown in the figure, but even when the transcription device 18 is fixed in the copying machine body 10, it is possible for the housing 26 of the process unit 20 to be in the shape of a right-angled parallelepiped.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A copying machine comprising the body of said copying machine and a process unit attachable to and detachable from the body of said copying machine, wherein said process unit comprises a generally closed housing, and a photosensitive drum, a charging device, a developing apparatus, and a cleaning apparatus completely within said housing of said process unit, said process unit having a route of conveyance for recording paper that tunnels through said housing in the region under said photosensitive drum; and the shape of the housing of said process unit is a right-angled parallelpiped.

2. A copying machine according to claim 1, wherein said copying machine body is provided with a transcription device that is introduced into the housing of said process unit.

3. A copying machine according to claim 1, wherein said copying machine body is provided with a transcription device that is fixed into the housing of said process unit.

4. A copying machine comprising the body of said copying machine and a process unit attachable to and detachable from the body of said copying machine, wherein said process unit comprises a housing, and a photosensitive drum, a charging device, a developing apparatus, a cleaning apparatus within said housing of said process unit, and a route of conveyance for recording paper that tunnels through said housing in the region under said photosensitive drum; and copying machine body is provided with a transcription device; and a transcription chamber in which said transcription device is disposed is formed in the region under the photosensitive drum within said housing.

5. A copying machine according to claim 4, wherein said route of conveyance for recording paper is provided between said photosensitive drum and said transcription chamber.

6. A copying machine according to claim 4, wherein an opening for the introduction of the transcription device into the transcription chamber is provided in the housing.

7. A copying machine according to claim 6, wherein a pliable sealing material with which the opening for the introduction of the transcription device can be opened and closed is provided in the housing.

8. A copying machine according to claim 7, wherein said sealing material is pushed by said transcription device when said process unit is being installed in the copying machine body, thereby opening said opening for the introduction of the transcription device into the transcription chamber.

9. A copying machine according to claim 7, wherein said sealing material cuts off light.

10. A copying machine according to claim 6, wherein the housing has an intake opening and an ejection opening for conveyance of recording paper and the intake opening and/or the ejection opening of the route of conveyance for recording paper is provided with a guide plate that can open and close said intake opening and/or the ejection opening.

11. A copying machine according to claim 10, wherein said guide plate opens the intake opening and/or the ejection opening when said process unit is installed in the copying machine body, and said guide plate closes the intake opening and/or the ejection opening when said process unit is detached from the copying machine body.

12. A copying machine according to claim 11, wherein when the intake opening and/or the ejection opening is opened, said guide plate is rotated toward the inside of the housing and stopped in such a manner that the leading edge of the guide plate is in a slanted position in the vicinity of the photosensitive drum.

13. A copying machine according to claim 12, wherein said guide plate is rotatably attached to the housing, said guide plate being provided with a spring means, by which said guide plate is pushed so as to close the intake opening and/or the ejection opening, and a rotating means, by which said guide plate is rotated, resisting the spring power of said spring means by a given angle when the process unit is installed in the copying machine body.

14. A copying machine according to claim 4, wherein the intake opening of said route of conveyance for recording paper is at a position higher than that of the ejection opening thereof.

15. A copying machine comprising the body of said copying machine and a process unit attachable to and detachable from the body of said copying machine, wherein said process unit comprises a photosensitive drum, a charging device, a developing apparatus, a cleaning apparatus within a housing of said process unit, and a route of conveyance for recording paper that tunnels through said housing in the region under said photosensitive drum, and said copying machine body is provided with a transcription device fixed into the housing of said process unit, said route of conveyance for recording paper being provided with a guide plate that can open and close an intake opening and an ejection opening of the route of conveyance for recording paper.

16. A copying machine according to claim 15, wherein said guide plate opens the intake opening and- /or the ejection opening when said process unit is installed in the copying machine body, and closes the intake opening and/or the ejection opening when said process unit is detached from the copying machine body.

17. A copying machine according to claim 16, wherein when the intake opening and/or the ejection opening is opened, said guide plate is rotated toward the inside of the housing and stopped in such a manner that the leading edge of the guide plate is in a slanted position in the vicinity of the photosensitive drum.

18. A copying machine according to claim 17, wherein said guide plate is rotatably attached to the housing, said guide plate being provided with a spring means, by which said guide plate is pushed so as to close the intake opening and/or the ejection opening, and a rotating means, by which said guide plate is rotated, resisting the spring power of said spring means by a given angle when the process unit is installed in the copying machine body.

* * * * *